US008093777B2

United States Patent
Stiesdal

(10) Patent No.: US 8,093,777 B2
(45) Date of Patent: Jan. 10, 2012

(54) GROUP OF THREE STATOR WINDINGS FOR A STATOR OF AN ELECTRIC MACHINE, A STATOR ARRANGEMENT, A GENERATOR, AND WIND TURBINE

(75) Inventor: Henrik Stiesdal, Odense (DK)

(73) Assignee: Siemens Aktiengesellschaft, Munich (DE)

( * ) Notice: Subject to any disclaimer, the term of this patent is extended or adjusted under 35 U.S.C. 154(b) by 158 days.

(21) Appl. No.: 12/562,237

(22) Filed: Sep. 18, 2009

(65) Prior Publication Data

US 2010/0066195 A1 Mar. 18, 2010

(30) Foreign Application Priority Data

Sep. 18, 2008 (EP) .................................... 08016467

(51) Int. Cl.
*H02K 1/00* (2006.01)
*H02K 3/00* (2006.01)
*H02K 17/00* (2006.01)
*H02K 19/00* (2006.01)
*H02K 21/00* (2006.01)
*H02K 23/26* (2006.01)

(52) U.S. Cl. ........ 310/198; 310/201; 310/203; 310/208; 310/260

(58) Field of Classification Search .................. 310/198, 310/201, 260, 208, 203; *H02K 1/00, 3/00, H02K 17/00, 19/00, 21/00, 23/26*
See application file for complete search history.

(56) References Cited

U.S. PATENT DOCUMENTS

| 3,531,672 | A | * | 9/1970 | King ............................. 310/180 |
| 4,315,179 | A | * | 2/1982 | Davey .......................... 310/184 |
| 4,346,320 | A | * | 8/1982 | Davey .......................... 310/179 |
| 5,619,787 | A | * | 4/1997 | Couture et al. .................. 29/596 |
| 5,714,824 | A | * | 2/1998 | Couture et al. ............... 310/208 |
| 5,955,810 | A | * | 9/1999 | Umeda et al. .................. 310/208 |
| 6,229,241 | B1 | * | 5/2001 | Ishigami et al. ............... 310/208 |
| 6,791,227 | B2 | * | 9/2004 | Yasuhara et al. .............. 310/201 |
| 6,911,759 | B2 | * | 6/2005 | Kalsi ............................ 310/208 |
| 6,940,204 | B2 | * | 9/2005 | Yamazaki et al. ............. 310/208 |
| 2006/0066167 | A1 | * | 3/2006 | Saito et al. .................... 310/201 |
| 2010/0066195 | A1 | * | 3/2010 | Stiesdal ........................ 310/198 |

FOREIGN PATENT DOCUMENTS

DE 10 2005 059 846 A1 6/2007
JP 61185045 A 8/1986

* cited by examiner

Primary Examiner — Quyen Leung
Assistant Examiner — John K Kim

(57) ABSTRACT

In one aspect, a stator is provided having a first cylindrical surface with a plurality circumferentially spaced winding slots, each winding slot extending along an axial length of the first cylindrical surface and formed to embed a segment of a single stator winding, Each stator winding is pre-formed as a closed loop and two substantially parallel segments of each stator winding formed to be embedded in a first and a second winding slot of the stator, with the second winding slot being the third adjacent winding slot to the first winding slot. Each of the three stator windings has a first winding head segment leaving the winding slots in axial direction of the stator, the first winding head segment of a first winding of the three stator windings describing in space in parts a combination of a rotation about an axis and a translation along that axis.

17 Claims, 1 Drawing Sheet

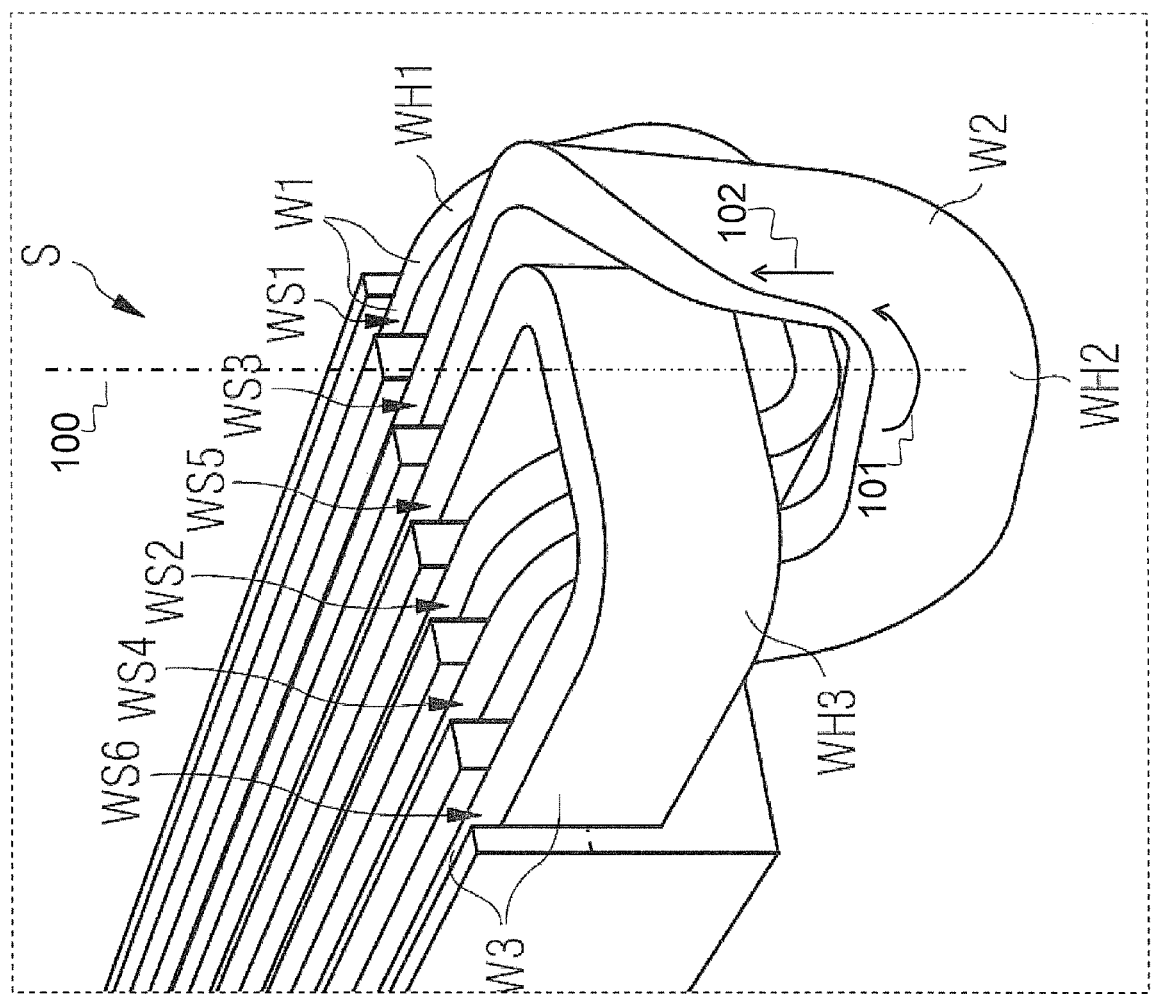

GROUP OF THREE STATOR WINDINGS FOR A STATOR OF AN ELECTRIC MACHINE, A STATOR ARRANGEMENT, A GENERATOR, AND WIND TURBINE

CROSS REFERENCE TO RELATED APPLICATIONS

This application claims priority of European Patent Office application No. 08016467.6 EP filed Sep. 18, 2008, which is incorporated by reference herein in its entirety.

FIELD OF INVENTION

The invention relates to a group of three stator windings for a stator of an electric machine. The invention concerns also a stator arrangement comprising such stator windings, a generator—e.g. a direct drive generator for a wind turbine—comprising such a stator as well as a wind turbine comprising such a generator.

BACKGROUND OF INVENTION

In large electrical machines or generators it is common to use a so called double-layer winding. This winding type has the benefit that all coils are identical and the coils are easy to manufacture.

SUMMARY OF INVENTION

However, in electrical machines with a high number of poles and a small pole pitch the traditional double layer windings can be difficult to mount because an insertion of a last coil within dedicated slots require to temporarily lift a first coil out of the slots while completing the winding of the coil, so that the last coil can be inserted underneath the temporarily removed part of the first coil.

Furthermore, for a segmented electrical machine double layer windings require coils that connect across the segment joint.

It is possible to make single-layer windings that do not require the removal of the first inserted coils when inserting the last coils in a stator. It is also possible to make single-layer windings that do not need to cross segment joints. Consequently, single-layer windings can be advantageous for large electrical machines.

Single-layer windings normally require both in-plane and out-of-plane winding overhangs. These winding overhangs are also called end windings or winding heads.

It is possible to make a single layer winding that does not need to cross the segment joint of a segmented stator, but when using known single-layer technology this leads to large winding overhangs taking up a large space at the ends of the stator pack and consuming large amounts of copper for the winding.

It is therefore an object of the present invention to provide a group of stator windings, a stator arrangement, a generator as well as a wind turbine in such a way, that the winding overhangs consume less copper.

The object of the invention is inventively achieved by a group of three stator windings, a stator arrangement, by a generator, and by a wind turbine.

Advantageous embodiments can be found in the dependent claims.

According to the invention a group of three stator windings for a stator of an electric machine—e.g. a generator—is defined, whereas the stator having a first cylindrical surface with a plurality circumferentially spaced winding slots formed in it, each winding slot extending along an axial length of the first cylindrical surface and set up to embed a segment of a single stator winding. Each stator winding is pre-formed as a closed loop. Two substantially parallel segments of each stator winding are set up to be embedded in a first and a second winding slot of the stator, with the second winding slot being the third adjacent winding slot to the first winding slot. Each of the three stator windings has a first winding head segment leaving the winding slots in axial direction of the stator. According to the invention the first winding head segment of a first winding of the three stator windings describes in space in parts a combination of a rotation about an axis and a translation along that axis.

More specific, the part of the first and/or second winding head segment, which is the combination of the rotation and the translation may be substantially screw axis symmetric.

Additionally this axis may be substantially perpendicular to a plane of the winding slots.

The invention is in particular advantageous because the overall length of all windings and therefore also the coils may be kept at a minimum length resulting in a reduction of material for the windings, especially copper. Besides, this also results in a reduction of weight, e.g. a couple of hundred kilograms in a large generator for example in a wind turbine.

Additionally the invention allows reducing the axial extent of the winding heads so that the stator including the windings will have a smaller axial dimension. This may reduce the dimension of the housing of the electric machine and also the overall weight of the electric machine.

Besides, the invention allows advantageously having all three coils with substantially the same length and therefore having all the same resistance. This is true for the three windings but particularly also for the three coils that each are comprised of a plurality of the same number of windings. This then also results in that the three coils pull the same current.

Advantageously the three windings represent the three phases in an electrical machine with one pole per slot per phase and are arranged of equal angular pitch, and—in terms of the distance between the first and the second winding slot—with a pitch of three winding slot pitches. This means that between the first and the second winding slot of a first winding and between the second winding slot of a first winding to the first winding slot of another winding belonging to the same coil representing one phase, two winding slot gaps are existing that will be filled with two further windings belonging to two further coils for the other two phases.

Besides, advantageously the invention concerns single-layer stator windings so that only one winding will be mounted in one winding slot.

The stator windings may be pre-formed that way that the cross-section of a winding will be substantially rectangular. The cross section of the windings may be the same overall the whole loop of the winding.

The winding heads may be arranged that the windings do not touch each other when mounted into adjacent winding slots.

The above mentioned invention defines a first winding head extending in one axial direction of the stator. Obviously to close the loop also a second winding head is present extending in the other axial direction of the stator. In a preferred embodiment, the second winding head has the same dimension and structure as the first winding head, possibly being reflection symmetric and/or point symmetric to the first winding head.

Besides, at least one of the three stator windings may itself be reflection symmetric with the axis of symmetry being parallel to the winding slots, including also the first and the second winding head.

An advantageous shape for an example of the winding heads will be explained later with respect to a schematic drawing.

The object of the present invention is also inventively achieved by a stator arrangement comprising the group of windings as described before, by a generator comprising such a stator arrangement and a wind turbine comprising such a generator.

BRIEF DESCRIPTION OF THE DRAWINGS

The invention will in the following be explained in more detail with reference to the schematic drawings, wherein FIG. 1 shows three winding heads of three windings.

DETAILED DESCRIPTION OF INVENTION

FIG. 1 shows a three-dimensional section of a stator S for a large conventional rotating electrical machine—especially a generator for a wind turbine. The complete stator S comprises a stator core SC and a large number of open-type radial winding slots WS1, WS2, . . . that are uniformly spaced around the circumference of the radially inner or outer surface of the stator core SC, depending whether the stator S is an inner or an outer stator of the electrical machine. Due to the large dimension of the stator S, the shown section of the stator S appears in FIG. 1 as a cuboid with substantially parallel winding slots WS1, WS2, . . . , WSx (x being a integer value of 1 to 6). This is acceptable as an approximation but it need to be understood that the adjacent winding slots WS1, WS2, . . . are not completely parallel planes regarding their slots, because the slots all are directed radially to a centre axis of the electrical machine. As a further approximation—or in other situations this might be absolutely true—the slots are cuboid narrow channels with a rectangular cross-section.

It has to be noted that in the example the winding slots WS1, WS2, . . . are arranged parallel to the longitudinal axis of the stator S, but it is also possible to have the winding slots formed at an angle to the longitudinal axis of the stator.

The stator core SC may be laminated, i.e. formed from a plurality of axially stacked laminations.

FIG. 1 shows furthermore three windings W1, W2, W3 that are pre-formed and have a rectangular cross-section fitting right into the winding slot WS1, WS2, . . . grooves.

In FIG. 1 a single layer stator winding is shown, so that only a single segment of a single winding W1, W2, W3 is placed into a single winding slot WS1, WS2, . . . —instead of placing a segment of a first winding and a segment of a second winding into single winding slot being substantially on top of each other in the slot, as it is done for double-layer winding.

Furthermore the windings W1, W2, W3 each have two segments that get inserted into two winding slots—e.g. winding W1 will be inserted with one segment of the winding loop into the first winding slot WS1 and with another segment of the winding loop into the second winding slot WS2. The windings W1, W2, W3 are closed loops therefore requiring a section to close the loops between the substantially parallel sections of the windings inside the winding slots. This is done via winding heads WH1, WH2, WH3 that extend outside of the stator S and close the loop at both axial ends of the stator S.

The winding slots build pairs of slots to mount a single winding. In the FIGURE the winding slots WS1 and WS2 build a pair of slots for the winding W1, the winding slots WS3 and WS4 build a pair of slots for the winding W2, and the winding slots WS5 and WS6 build a pair of slots for the winding W3.

To properly map the windings to the used terminology of the claims, the "first winding" of the claims corresponds to winding W2, the "second winding" to winding W3, and the "third winding" corresponds to winding W1.

It is assumed that each of the windings is symmetric—e.g. axial symmetric to a radial plane in the centre of the stator S—, so in the following usually only one winding head of the windings is observed, but all that is said is also applicable to the winding heads at the other end of the stator S.

Furthermore it is assumed that the length of all windings might not be identical but fairly similar in length. Besides a slight difference in length, the only difference between the first winding W1, the second winding W2, and the third winding W3 is the three-dimensional shape of their winding heads WH1, WH2, WH3.

Regarding the winding W1 it is assumed that it is substantially formed that way that the winding head WH1 stays in an area between the radial plane of the winding slot WS1 and the radial plane of the winding slot WS2, so that the winding W1 does not touch or interfere adjacent windings. The winding head WH1 may extend in radial direction between these radial planes, but it is assumed only the space in one radial direction—radially inwards for an inner stator—should be used so to not interfere with the rotor, which is not shown in the FIGURE. Taking the circumferential surface of the stator core SC as the reference plane, for an inner stator the space from that reference plane facing the axis of the stator could be consumed for the winding head WH1. For an outer stator the space from that reference plane facing the radial outside of the electrical machine until the housing of the electrical machine could be consumed for the winding head WH1.

The above said regarding winding W1 and winding head WH1 applies accordingly also for the winding W2 and W3 with their winding heads WH2 and WH3.

The windings W1, W2, and W3 furthermore are preferably formed that way that they can easily be mounted by following a specific order of mounting the windings into the stator winding slots. Specifically the windings should not to be tangled up so that all three windings need to be mounted altogether in one step. Preferably the windings should be formed like this that as a first option all windings W1 could be inserted overall the stator or overall one stator segment, followed by winding W2 and finally by winding W3. As a second option the stator could be mounted with the windings W1, W2, W3 winding by winding, putting in first a single W1, then single W2, followed by a single W3, and starting all over again with W1.

In the following description, if the terms "underneath" or "above" or similar directional terms are used, this belongs to the orientation as it is shown in FIG. 1. "Above" or "upwards" means in the direction from where the windings get mounted into the stator S. For an inner stator this means the direction away from the centre axis of the stator. With "underneath" or "downwards" the opposite direction is meant, i.e. for an inner stator the direction to the centre axis of the generator.

In FIG. 1, the winding head WH3 extends in the plane of the two substantially parallel segments of the stator winding W3, which is the plane of the winding slots. The winding loop stays in one plane and is flat and not tilted out of the plane. In other words, once mounted, winding W3 including its winding head WH3 stays in the same plane as the plane of the winding slots WS5 and WS6 of the stator S.

The length of the section of the winding head WH3 that longitudinally extends the winding outside of the stator core SC is set up that way, that the winding length of winding W3 has preferably substantially the same length as the length each of the other two windings W1 and W2, as far as possible.

Now regarding the winding W1, its winding head WH1 comprises a section that is continuously tilted on a curvature, whereas the curvature is a 90 degree segment of a substantially circular arc. In the FIGURE, after the 90 degree turn has reached, the winding W1 then further extends in a plane that is perpendicular to the plane of the substantially parallel winding segments or the plane of the winding slots WS1 and WS2.

The winding head WH1 then proceeds underneath the other winding heads WH2 and WH3 with a substantially straight connection.

Alternatively and not shown in the FIGURE the winding head WH1 might be tilted at one pivotal point and then might extend in a plane different from the plane of the two substantially parallel segments of the stator winding W1. The pivotal point may be in the area of the winding head W11 and close to the substantially parallel segments of the stator winding W1. Therefore the winding W1 may be tilted close to the stator block. The winding head WH1, after the turn at the pivotal point then would extend underneath the other winding heads WH2 and WH3.

The winding W1 might perform a "sharp turn" at the pivotal point but preferably might also perform a continuous change of direction over a specific section around the pivotal point.

The change of direction at the pivotal point might be an angle between 0 and 90 degrees, measured from the plane of the two substantially parallel segments.

Yet in another not shown alternative, the winding W1 may differ from the previously said that the section that is continuously tilted on a curvature of the winding head WH1 may have a curvature that is more than a 90 degree segment of a substantially circular arc. Specifically as an example, the angle, taken from the plane of the stator winding slots may be about 135 degrees. This allows a very compact arrangement.

Not mentioned so far, the two windings W1, W3 close their loops between the radial planes of their winding slots with a connection section perpendicular to these mentioned radial planes. The transition from the winding head sections located in the radial planes to/from the connection section is performed via a 90 degree turn with a fairly small radius. The connection itself is then substantially plain and straight.

The winding W3, which is not tilted at all, can be viewed as a substantially rectangular belt. The winding W1 can also be seen as such rectangular belt, only with the modifications that close to the corner the longer side of the rectangular is bent.

Due to the fact that the cross-section of each winding W1, W2, W3 is substantially rectangular, the connection section—i.e. the connection to overcome the distance between a pair of winding slots like WS1 and WS2, parallel to the side surface of the cylindric stator core SC—of windings W1 and W3 itself is substantially cuboid and therefore located in a plane of the cuboid. Regarding winding W3, this plane of the connection section of winding head WH3 is parallel to the side surface of the cylindric stator core SC. Regarding winding W1, the plane of the connection section of winding head WH1 is substantially in a 90 degree angle in relation to the side surface of the cylindric stator core SC or, in other words, parallel to the plane of the stator winding slots.

Proceeding to winding W2, this winding W2 is mounted into the winding slots WS3 and WS4. Displayed is a first winding head segment WH2 of a the winding W2—which is specified as "first" winding in the claims—describing in space in parts a combination of a rotation 101 about an axis 100 and a translation 102 along that axis 100. Substantially this segment part of the winding head WH2 is screw axis symmetric 100, the axis being substantially perpendicular to a plane of the winding slots WS3, WS4.

More specifically, winding head WH2 describes for a part of the winding head WH2 a three-dimensional form characterised in that the displayed segment of winding head WH2 of the stator winding W2 is—starting from the winding slot WS4—continuously tilted on a curvature downwards until the curvature is substantially a 90 degree segment of a substantially circular arc. Then the winding W2 is continuously tilted on a curvature in the opposite direction in the same plane until the winding W2 is directed again substantially in an axial direction of the stator S. At that point the winding head WH2 is underneath the winding head WH3. Then the shape of the winding head WH2 continues with a combination of the rotation in direction of winding slot WS3 about an axis that is substantially perpendicular to the plane of the winding slots WS3, WS4 and an upward translation along that axis.

This combination of the rotation about the axis and the translation along that axis is continued for the winding head WH2 until the winding cross-section faces the longitudinal extension of the winding slot WS3 and being in the same plane as the winding slots WS3, WS4. Then, the winding head WH2 is substantially above the winding head WH1, so that the winding head WH2 can cross the winding head WH1 without interference. Finally, the winding head WH2 is continued above winding head WH1 in the direction of the winding slot WS3 in a straight fashion.

All in all and by looking from the top at the winding W2, winding head WH2 performs a half circle to close the winding W2 between winding slots WS3 and WS4.

The just discussed embodiment has the advantage that the length of each winding can be reduced and that the length of the three windings is fairly the same. This allows a vast reduction of material for the windings and a major reduction of weight.

It has to be understood that slight variations of the embodiment, especially regarding the perfectness of the circular arc, regarding the perfect planarity of the mentioned planes, or regarding specifically mentioned angles, are also covered by this invention.

The invention claimed is:

1. A group of three stator windings for a stator of an electric machine, wherein
 the stator comprises a first cylindrical surface with a plurality circumferentially spaced winding slots, each winding slot extends along an axial length of the first cylindrical surface and formed to embed a segment of a single stator winding,
 each stator winding is pre-formed as a closed loop, two substantially parallel segments of each stator winding are formed to be embedded in a first and a second winding slot of the stator, with the second winding slot being the third adjacent winding slot to the first winding slot,
 each of the three stator windings includes a first winding head segment extending from the winding slots in axial direction of the stator, and
 the first winding head segment of a first winding of the three stator windings is at least partially rotated and translated about an axis,
 wherein the planes of the connections of the second and the third stator windings are out of parallel alignment.

2. A group of three stator windings according to claim 1,
wherein each of the three stator windings comprises a second winding head segment extending the winding slots in opposite axial direction of the stator than the first winding head segment, and
wherein the second winding head segment of one of the windings of the three stator windings is at least partially rotated and translated about an axis.

3. A group of three stator windings according to claim 1, wherein the part of the first and/or second winding head segment, which is the combination of the rotation and the translation is substantially screw axis symmetric.

4. A group of three stator windings according to claim 1, wherein the electric machine is a generator.

5. A group of three stator windings according to claim 1, wherein a second winding and a third winding of the three stator windings are reflection symmetric with the axis of symmetry being parallel to the winding slots.

6. A group of three stator windings according to claim 1, wherein the first and the second winding head segments are reflection symmetric and/or point symmetric to each other.

7. A group of three stator windings according to claim 1, wherein the first winding head segment of one of the three stator windings is identical in form as the second winding head segment of another one of the three stator windings.

8. A group of three stator windings according to claim 1, wherein the first and/or the second winding head segments of a second winding of the three stator windings extend in the plane of the two substantially parallel segments of each stator winding.

9. A group of three stator windings according to claim 1, wherein the first and/or the second winding head segments of a third of the three stator windings comprising a section that is continuously tilted on a curvature.

10. A group of three stator windings according to claim 9, wherein the curvature is a 90 degree segment of a substantially circular arc.

11. A group of three stator windings according to claim 1, wherein for the second and the third winding the first and/or the second winding head segments comprises a substantially straight connection between a curvature section within the plane of the first winding slot of the stator and a curvature section within the plane of the second winding slot of the stator, the connection being arranged in a plane substantially perpendicular to the planes of the first and second winding slots.

12. A group of three stator windings according to claim 1, wherein the first and/or the second winding head segments of the first stator winding being continuously tilted on a curvature until the curvature is substantially a 90 degree segment of a substantially circular arc, then being continuously tilted on a curvature in the opposite direction in the same plane, leading to the combination of the rotation about the axis and the translation along that axis of the respective winding head of the first stator winding.

13. A stator arrangement, comprising:
a plurality of groups of three stator windings according to claim 1.

14. A wind turbine, comprising:
a generator comprising a stator arrangement according to claim 13.

15. A group of three stator windings according to claim 1,
wherein the first winding head segment of each of the three stator windings has a geometry, and
wherein each of the first winding head segments has an unsimilar geometry.

16. A group of three stator windings for a stator of an electric machine, wherein
the stator comprises a first cylindrical surface with a plurality circumferentially spaced winding slots, each winding slot extends along an axial length of the first cylindrical surface and formed to embed a segment of a single stator winding;
each stator winding is pre-formed as a closed loop, two substantially parallel segments of each stator winding are formed to be embedded in a first and a second winding slot of the stator, with the second winding slot being the third adjacent winding slot to the first winding slot,
each of the three stator windings includes a first winding head segment extending from the winding slots in axial direction of the stator, and
the first winding head segment of a first winding of the three stator windings is at least partilly rotated and translated about an axis,
wherein for the second and the third winding the first and/or the second winding head segments comprises a substantially straight connection between a curvature section within the plane of the first winding slot of the stator and a curvature section within the plane of the second winding slot of the stator, the connection being arranged in a plane substantially perpendicular to the planes of the first and second winding slots; and
wherein the planes of the connections of the second and the third stator windings are out of parallel alignment.

17. A group of three stator windings according to claim 12, wherein the combination of the rotation about the axis and the translation along that axis is continued for the respective winding head of the first stator winding until the winding cross section faces the longitudinal extension of the second winding slot and being in the same plane as the winding slots.

\* \* \* \* \*